Dec. 23, 1924.  
H. F. RUGGLES  
EVAPORATING APPARATUS  
Filed Nov. 2, 1922  
1,520,368  
2 Sheets-Sheet 1
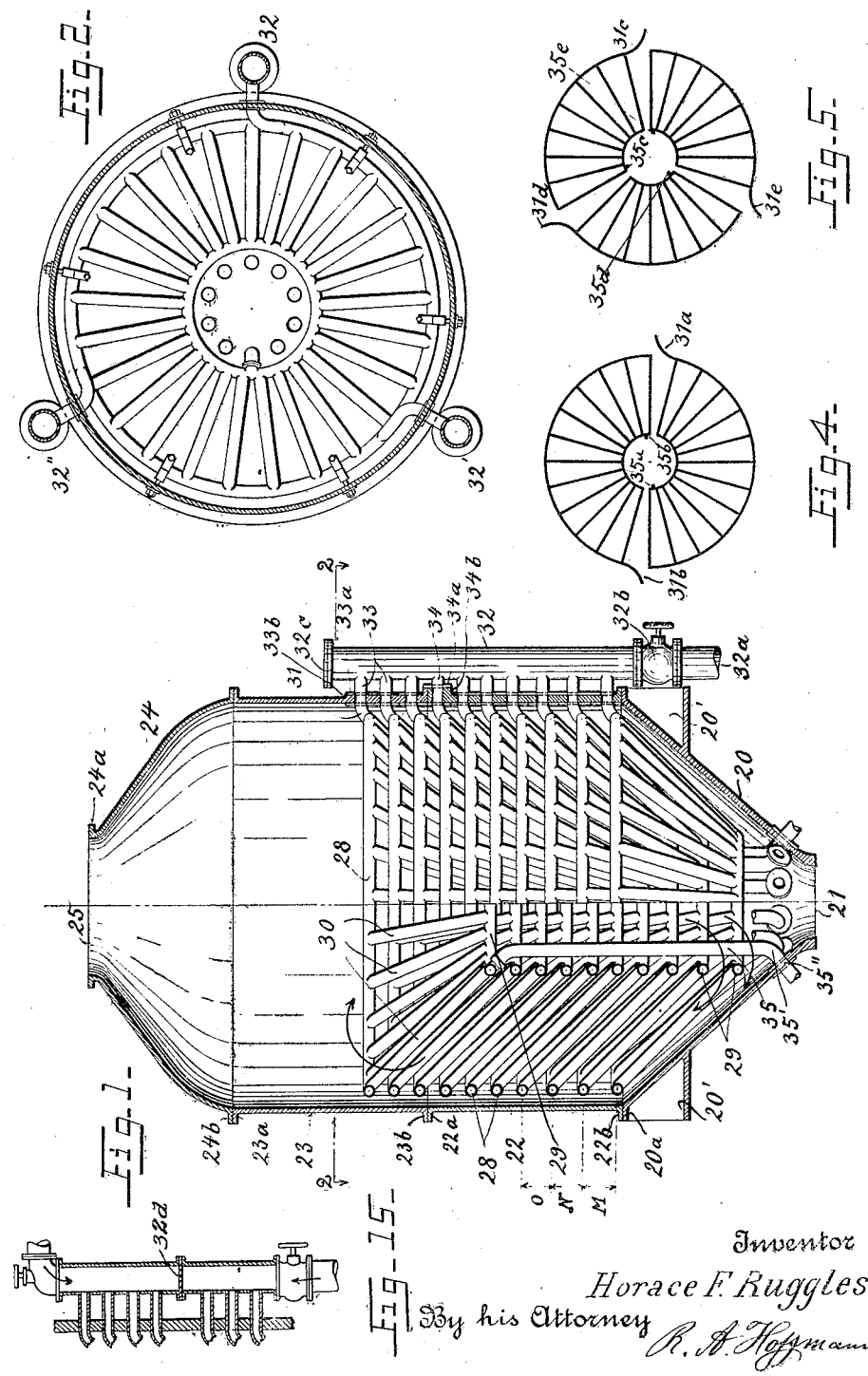
Inventor  
Horace F. Ruggles  
By his Attorney  
R. A. Hofmann Dec. 23, 1924.
H. F. RUGGLES
EVAPORATING APPARATUS
Filed Nov. 2, 1922
1,520,368
2 Sheets-Sheet 2
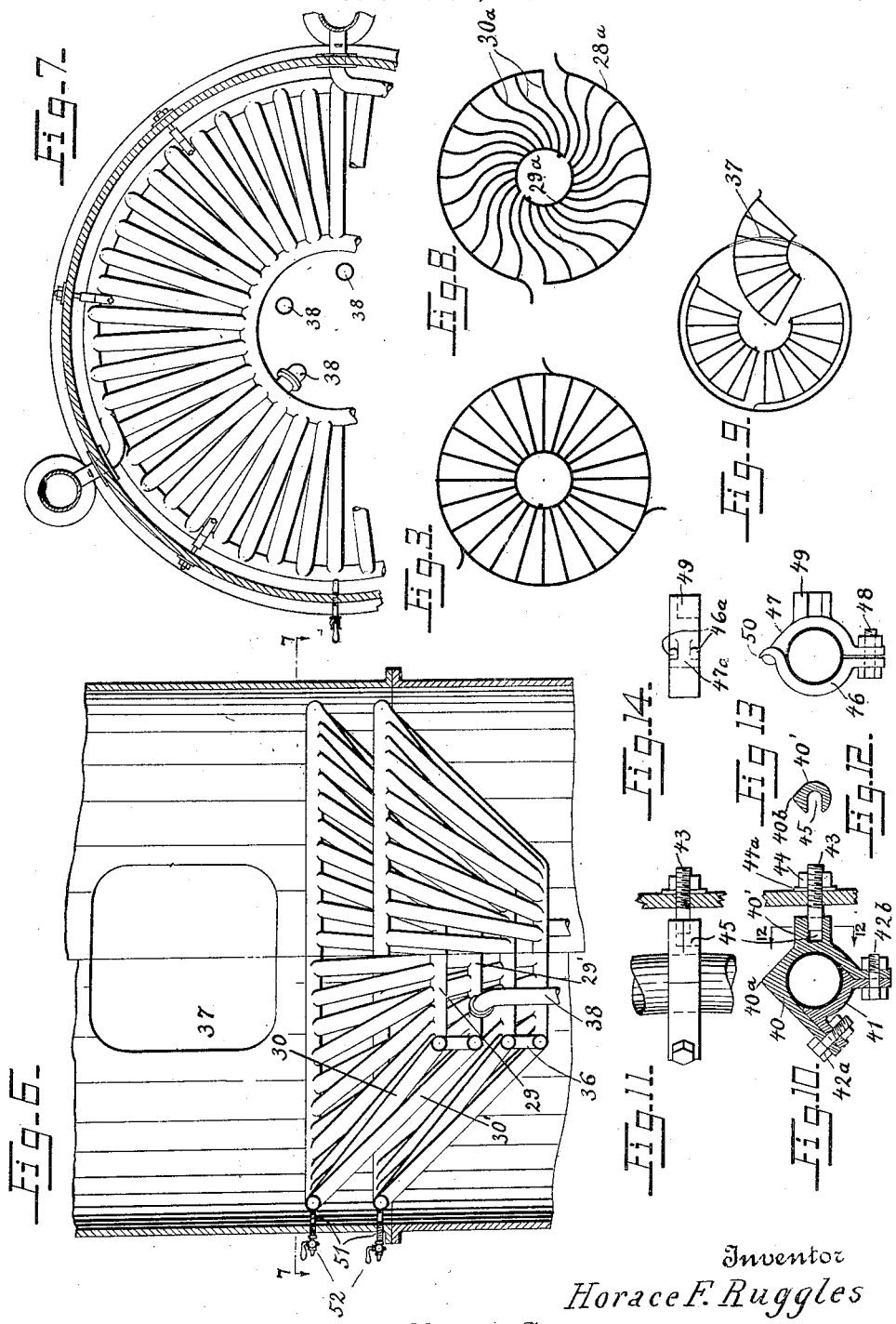
Inventor
Horace F. Ruggles
By his Attorney
R. D. Hoffmann Patented Dec. 23, 1924.

1,520,368

UNITED STATES PATENT OFFICE.

HORACE F. RUGGLES, OF NEW YORK, N. Y.

EVAPORATING APPARATUS.

Application filed November 2, 1922. Serial No. 598,456.

*To all whom it may concern:*

Be it known that I, HORACE F. RUGGLES, a citizen of the United States, residing at New York, in the county of Kings and State of New York, have invented certain new and useful Improvements in Evaporating Apparatus, of which the following is a specification.

This invention relates to improvements in evaporating apparatus for the condensing and evaporating of liquids in which substances of a viscuous or a crystallizable nature are suspended, respectively dissolved, and its principal intended application refers to vacuum pans, as used in raw sugar houses for the reduction of the sugar liquid coming from the multiple effects, the so-called "meladura" into "massecuite," a sugar liquor which is concentrated up to the point of incipient crystallization.

In a similar way these vacuum apparatuses are used in refineries for concentrating the redissolved and refined raw sugar again. The applicability of the invention is however not confined to sugar manufacturing processes but is equally evident in the case of other evaporating pans, for instance for condensing of milk, concentrating of fruit juices in canning factories, refining of oils and numerous other purposes.

The first object of the invention is to provide an evaporating pan with a maximum available heating surface.

Another object is to so subdivide this heating surface, that part or the whole of it may be used arbitrarily, and steam of different pressure and temperature may be utilized, in succession or simultaneously, providing a perfect control over the concentrating process, quickening it or slowing it down, as circumstances may require.

A third object is to arrange the heating surface, respectively the steam tubing in such manner, that it forms no serious impediment to the proper circulation of the heated and evaporating liquid, but on the contrary helps and advances the formation of natural vortices of the same.

A fourth object is to provide means of exchanging and removing portions of the tubing for repair purposes without dismantling or taking apart the whole pan.

A fifth object is to devise an arrangement of tubes which is simple, uniform, and nonexpensive in its units.

A sixth object is to avoid and eliminate as much as possible all structures or elements liable to form depositories for solidifying components of the liquids, which form a source of much annoyance and fouling of the pans.

These different objects are attained by the novel construction and arrangement of parts hereinafter described and shown in the accompanying drawings, in which:—

Figure 1 is a vertical section through the main body of an evaporating pan, exhibiting the novel arrangement of the heating tubes, forming the principal subject of the invention. All usual accessories, not directly pertaining to the described improvements, are omitted, as their application and construction is well understood and can easily be supplemented by those skilled in the art. The left half shows the tubes in section, the right half shows them in full.

Figure 2 is a horizontal section through the pan, taken on the line 2—2 of Figure 1.

Figure 3 is a diagrammatical top view of one of the annular tube units, showing a continuous circuit provided with three steam inlets.

Figure 4 is a similar diagrammatical top view of a tube unit, but made up of two sections, instead of the integral circuit shown in Figure 3.

Figure 5 is another diagrammatical top view of a tube unit, made up in three sections.

Figure 6 is a fragmentary vertical section of a pan drawn up similarly to Figure 1, but illustrating a slight modification of the tube arrangement. The left half of the figure indicates half of the manhole, provided in the upper portion of the shell.

Figure 7 is a partial horizontal section through this modified pan, taken on line 7—7 of Figure 6.

Figure 8 is a diagrammatical top view of a tube unit, made up of two sections showing a modified form of the inclined connecting tubes.

Figure 9 is a diagram, illustrating the manner, in which a section of an annular tube unit can be removed for repair purposes through the manhole, shown in Figure 6.

Figure 10 is a sectional detail of a tube chair, as proposed for the support of the separate tube units.

Figure 11 represents a top view of the same.

Figure 12 is a section, taken on line 12—12 of Figure 10.

Figure 13 shows a similar chair of a modified construction.

Figure 14 shows a top view of this chair.

Figure 15 is a sectional view of a modified manifold adapted for the separate introduction of live and exhaust steam.

Having reference to the drawings in detail, the shell of the pan is shown as being made up in cylindrical and conical sections, provided with annular flanges, bolted together, which is the usual way of constructing a vertical vacuum or strike pan.

The bottom casting 20 is in the shape of an inverted cone, the circular wall converging downwardly to an outlet 21. To this outlet is attached the discharge valve,—not shown—for the concentrated and finished product, in the case of sugar-boiling: the masse-cuite.

The top flange 20$^a$ of the bottom casting is bolted to the bottom flange 22$^b$ of the cylindrical shell 22, and underneath this pair of flanges are provided the supporting lugs or saddles 20', usually four in number, which rest on the staging or platform of the pan, not shown here.

To the top flange 22$^a$ of the shell 22 is bolted the bottom flange 23$^b$ of the superimposed shell 23, and to the top flange 23$^a$ of the latter is similarly attached the botton flange 24$^b$ of the dome 24, which converges upwardly to a circular vapor outlet 25, surrounded by a top flange 24$^a$.

To this top flange can then be bolted the usual vapor piping—omitted in the drawing—, leading to the condenser and the vacuum pump connection.

Furthermore the evaporating pan is furnished with all necessary attachments, devices and connections, as for instance in the case of a sugar vacuum pan: steam and vacuum gages, thermometer, proof sticks, eye-glasses, meladura feed valves, tallow cups, and so forth, which every strike pan shows and which have no direct bearing on the purpose of this invention and are therefore omitted.

The heating system itself in its simplest form consists of a plurality of annular tube units, basketed one into the other, each unit comprising a circular top coil 28, arranged concentrically with, and, with appropriate clearance, fitting into the shell of the pan, and a concentric circular bottom coil 29 of much smaller diameter, and positioned a considerable distance below the top coil.

These two coils are communicating with each other through a series of downwardly inclined pipes 30, straight or, as shown afterwards, curved in the same direction (see 30$^a$, Figure 8).

This combination forms a trellis-like pipe basket of inverted conical shape, and the different units which preferably are of the same pattern, are superimposed over each other at equal vertical distances, with the exception of the lower ones, that can advantageously be spaced further apart in the vertical direction, as shown at M, N and O.

This spreaded position takes account of the greater density and viscuousity in the lower strata of the liquor, undergoing concentration, and also favors the unimpeded formation of the return stream at the lowest point, as indicated by arrows.

Thus all the single pipe elements of the same kind and shape are in vertical alignment with each other, as shown by the drawing, or they may be staggered alternately, if desired.

All the tubes inside the shell are seamless copper tubes with welded connections, strong enough to withstand high steam pressure.

Each of the pipe units must be provided with at least one inlet and one outlet pipe, leading to and from the outside of the shell.

In Figure 1 only one steam inlet 31, for each unit is shown, jointed into the annular top coil at a sharp angle or with a tangent curve, so as to avoid an abrupt turn or baffling obstacle in the steam path which would foster premature condensation (see the different diagrams).

All the inlets are arranged in vertical alignment and on the outside of the shell they unite in a manifold 32 of sufficient diameter to supply steam to all the units. This manifold is of the common form. The entrance for the steam is shown at 32$^a$. Numeral 32$^b$ represents a regulating and shutting off valve, and the top end is covered by a blind flange 32$^c$. The manifold and the outside steam fittings are made of cast iron.

At the points, where the manifold nipples 33 are joined by flanges 33$^a$ to the coil inlets of the pan, these latter are provided with protruding bosses or saddle flanges 33$^b$, which eventually may be merged into one continuous oblong flange as indicated in Figure 1. At the point, where the two cylindrical shells are flanged together, the protrusion of the flanges 22$^a$ and 23$^b$ may necessitate an interruption of the uniformity of the pipe connections, as shown. The nipple 34 is shortened, and its individual flange 34$^a$ is bolted to the saddle flange 34$^b$, which is flush with the outer rim of flanges 23$^b$ and 22$^a$.

The copper coil inlets 31 are expanded and crimped over into a recess between the pipe flanges in a well known manner,—not shown in detail,—so as to form a steam-tight connection.

Instead of a single steam inlet for each unit it will be found expeditious in most cases to provide two or three of them, as shown in Figures 2 and 3. This of course would call for a corresponding plurality of manifolds, arranged equi-distantly around the pan. See 32, 32' and 32'' in Figure 2.

The steam outlet pipes 35 are connected to the circular bottom coils 29, one to each unit, and are equally spaced around the inner circumference, as shown in Figure 2. This makes them of different lengths, each commencing a step lower than the preceding one, but all descending vertically to a common level where they are bent outwardly, as shown at 35' and flanged to the conical bottom 20 of the shell, provided with a series of corresponding outlets 35''.

On the outside these outlets are connected to a system of tailpipes, separate steam traps and valves, not specified in the drawing, but self-evident to those skilled in the art. The application of little air outlet branches 51, Figs. 6 and 7, where necessary, with air cocks on the outside, conveniently located, is also a matter of detail, well understood by common sense and practice.

Regarding the different advantages the pipe system, so far as described, offers, it is apparent in the first place, that all pipe units drain easily towards the bottom outlet, so that they get rid of any condensation water without delay.

It is also obvious that the path of the steam is in opposite direction to the path of the rising liquor, and that the temperature of the entering steam is highest toward the top and among the thinnest liquor, also that the temperature decreases from the outside of the shell toward the middle. Any liquor, being heated in a cylindrical pan, where there are no obstacles to its path, has the tendency to circulate in the form of vortices rising along the inner surface of the pan, converging near the surface towards the center and sinking down again in the middle.

The liquor, expanding by the heat, becomes specifically lighter and the little steam bubbles, originating at the bottom and at the shell, also help to carry the liquid toward the top. At the surface however the steam bubbles detach themselves from the fluid parts, these become cooler and denser, as the evaporation process, initiated by the lighter pressure absorbs heat, and sink down again in a mushroomlike column in the centre of the pan, to repeat the circuit when they reach the bottom.

Most other pipe arrangements for pans, up to date, take not enough account of this phenomenon and therefore offer more or less handicaps and obstacles to these vortices. The novel arrangement shown however follows and favors the formation and circulation of such natural vortices. Aside from shortening the time it takes to bring the liquor to the point of ebullition, this condition and the avoidance of too many obstacles to the rising steam bubbles, also lessens the tendency to foam or prime and consequent entrainment, that is, in the case of sugar boiling; the transport of molasses particles by the vapor, and the ensuing contamination of the condensed water, making it unfit for further use.

One of the greatest advantages however, resulting from the peculiar construction, is the enormous increase of heating surface and output, without a corresponding decrease of capacity. To wit: A good average of heating surface for a 12 foot dia. pan (coil pan of any standard make) is 850 square feet, whereas a 12 foot pan, equipped with the novel pipe system, would represent 1800 square feet, that is, more than double that amount, or a heating surface of 1.83 sq. ft. per cu. ft. of content.

The main principle of the invention having been explained, it is next in order to describe a few modifications which under certain conditions will either cheapen the construction or add to the efficiency and convenience of operation.

As a look upon the plan view in Figure 2 will show, the connecting pipes 30, are spaced rather far apart at the top coils 28, while they crowd together at the bottom coil 29. It is therefore possible to insert a series of other connecting pipes 30' at the top, intermediate to the first ones, and lead them with a somewhat greater slope down to the bottom coil 29' underneath the first one. By this expedient it is possible to omit every other coil near the inner circumference of the shell, uniting two of the former pipe units into one, as Figures 6 and 7 illustrate. It also reduces the row of outlet pipes 38 to half its former number, as two bottom coils are always connected by communicating branches 36. Thus a considerable saving in cost can be attained for a slight sacrifice of heating surface.

In vacuum apparatus, especially in the sugar industry, it is the practice to use both, exhaust and a limited supply of live steam, consecutively, or at the same time.

Thin liquors or such of greater density, liquors which are more acid and such with an excess of alkali, demand individual treatment; and a close control of the heat supply is therefor essential. Excessive heat is not only uneconomical but results in inversion, that is, loss of crystallizable sugar and in caramelizing or burning of the sugar. Live steam at about 50 lbs. pressure with exhaust steam at about 10 lbs. back pressure at the steam traps is the desirable average and should be used variously with discretion.

Partly with regard to such heat control, but mainly for another reason stated below, it is proposed to split each pipe unit into independent halves or even thirds, as Figures 4 and 5 indicate. This would of course call for separate outlet pipes, preferably at a point, farthest away from the steam inlet, so that the steam is forced to pass through every member of the respective pipe section. In this way exhaust steam could enter at 31ª and escape at 35ª, while the opposite section could be supplied with live steam, entering at 31ᵇ and exhausting at 35ᵇ to the steam traps.

This arrangement would economize in the use of high pressure steam by supplementing it with the surplus of exhaust steam and would under circumstances be permissible.

In a similar way one of the three sections shown in Figure 5 might be reserved for live steam, and the other two working with exhaust steam. But preferably a division of the tubing into high and low pressure heating sections could be effected along horizontal dividing lines instead of splitting it vertically, reserving some of the circular lower units to exhaust steam, while live steam circulates through the upper coils. This division would entail a corresponding separation of the respective manifolds into upper and lower ones, for instance, by a diaphragm 32ᵈ, as shown in Fig. 15.

Finally, as Figure 8 shows, other variations in the arrangement and construction of the single unit are also possible without deviating from the main principle of the invention. The inclined connecting pipes 30ª, leading from the upper coils 28ª to the lower ones 29ª, may be curved, for instance in the shape of an S; and it is obvious, that thereby a considerable increase in length of these pipes and consequently in heating surface is attained.

The subdivision of the pipe units into two or more sections offers the important advantage of easy removal of portions of the tubing for repair purposes, as Fig. 9 illustrates.

If, as shown in Figure 1, the units consist of baskets, comprising two integral circular coils, the only way to reach a leak in a tube, is to remove the dome of the pan and successively take out as many units, as may be superimposed over the leaky one. If the units are subdivided however, then only the segments, that are installed over the leaky segment, need to be removed, and this may be accomplished by lifting and turning them through a manhole 37, provided in the shell above the top coil (see Figs. 6 and 9).

It remains to describe the means of supporting the heating pipes and to prevent them from floating.

The top coil of each unit is supported and held in place at equal intervals by a number of pipe clamps which in turn rest upon studs, threaded through the shell (see Fig. 7). These clamps may be of various construction, but two conditions should strictly be observed and fulfilled: first, that the coil should be free to expand, when heated, either sliding within the clamp or by providing sufficient clearance between the clamp and the stud, and secondly, that the clamps should not offer any horizontal surfaces, on which deposits from the liquor may settle and accumulate. Thus in the clamp shown in Figures 10 and 11, which consists of a saddle-like upper cap 40 and a smaller under cap 41, bolted together by bolts and nuts 42ª and 42ᵇ, the cap 40 is provided with a ridge 40ª, and the boss 40′, resting in the stud 43, is furnished with a similar ridge 40ᵇ, from which solid particles will slide off.

The stud, as Figure 12 shows, is slotted sidewise, at 45, and into this slot is inserted the stud 43, so that the clamp may be removed from the stud by sliding along over the pipe. The slot also permits the pipe to expand along its axis.

Another clamp of simpler form is shown in Figures 13 and 14. Here the two caps 46 and 47 are hinged together over the pipe, the cap 46 ending in a forked hook 46ª and the cap 47 in a T-shaped latch 47ª which interlock each other as shown in Figure 14. Both are rounded off appropriately to form a ridge 50. Underneath the pipe the caps are flanged and bolted together by a bolt and nut 48.

The boss 49 is formed similar to the one shown in Figure 13. The nut 44 which locks the stud in the shell, is drawn tight over a washer 44ª, of a material adapted to form a water and air proof joint.

The outside of the pan shell is usually lined with a heat-preserving wooden lagging, not specified in the drawing.

It is understood, that the principles of the invention allow many variations of execution, not described herein, and that the foregoing exposition is illustrative rather than restrictive.

What is sought to be protected by Letters Patent, is therefore defined by the following claims:—

1. In an evaporating apparatus, a plurality of uniform heating pipe units, arranged in superposition, each unit comprising two circular pipes around a common vertical axis, the upper pipe of larger, the lower one of smaller radius, connected by a plurality of converging branch pipes, means to supply steam to said upper circular pipes and means to exhaust the steam from said lower circular pipes.

2. In an evaporating apparatus, the combination with a receptacle, of a horizontal pipe, contained within said receptacle and running along and parallel with the inside of the receptacle, a second pipe positioned at a lower level than the first mentioned pipe, running parallel to said pipe and nearer to the middle of the receptacle, a plurality of branch pipes, connecting said horizontal pipes and converging toward the middle of the receptacle, means to supply steam to the horizontal pipe at the higher level and means to drain exhaust water from the horizontal pipe, positioned at the lower level.

3. In an evaporating apparatus the combination with an upright cylindrical receptacle; of a plurality of circular pipe ducts, positioned concentrically to the axis and in proximity to the wall of said receptacle, a second plurality of circular pipe ducts of smaller radii than the first one, positioned concentrically to the said axis, a plurality of branch pipes, connecting said circular pipe ducts in such manner that they always connect ducts of larger radii and higher level to ducts of smaller radii and lower level, and means to send steam for evaporating purposes through said system of pipes from points of the highest level to points of the lowest level.

4. In an evaporating apparatus the combination with a receptacle; of a plurality of heating pipe units, in superposition, each unit comprising a reversed cone frustrum formed of single pipes, communicating with each other and adapted to receive steam at the top circumference and exhaust it at the bottom circumference, and conducting means for steam, connecting with each unit separately from the outside of said receptacle.

5. In an evaporating apparatus, the combination with a receptacle; of a plurality of basket-shaped pipe units, consisting of two horizontal circular pipe runs, of different radius, the pipe runs of larger radius serving as steam distributing ducts, those of smaller radius serving as condensed water collecting ducts, said pipe runs to be concentrical to a common vertical axis, and connected by branch pipes, said basket-shaped pipe units to be arranged telescope-like one above the other, means to supply steam to each separate unit and means to exhaust the same from them.

6. In an evaporating apparatus, the combination with a cylindrical receptacle and means to supply steam of different pressure and temperature; of a plurality of steam heating pipes forming segmental units, adapted respectively to the reception, conduction and exhaust of said different steam supplies, each segmental unit consisting of superimposed subunits, each subunit comprising an upper horizontal circular pipe segment, serving as a steam receiving element, and a lower horizontal circular pipe segment, serving as an exhaust element, said segments communicating with each other through downwardly directed branch pipes serving as steam conducting elements.

7. In an evaporating apparatus the combination with a cylindrical receptacle; of two sets of superimposed circular pipes, one set positioned nearer to the shell, the other nearer to the axis of the receptacle, a plurality of branch pipes, forming communications between the two sets and converging toward the axis in their general direction, means to supply steam to the outer and upper set of pipes and means to exhaust it from the inner and lower set.

8. In an evaporating apparatus the combination with a cylindrical receptacle; of two sets of superimposed heating pipes, the first set positioned nearer to the shell and to the top, the other nearer to the axis and the bottom of the receptacle, both sets comprising circular pipe segments of uniform length and shape for each set respectively, a plurality of downwardly inclined branch pipes, forming communications between the corresponding circular segments and conducting means for supplying steam to the outer segments and means to exhaust steam from the inner segments, substantially as described and shown.

9. In an evaporating apparatus the combination with a receptacle of a plurality of inclined heating pipes, converging downwardly toward the middle of the receptacle, a communicating duct joining the upper ends of said inclined heating pipes and adapted to receive steam from the outside of the receptacle, and a communicating duct joining the lower ends of said inclined heating pipes and adapted to exhaust steam toward the outside of said receptacle.

10. In an evaporating apparatus the combination with a cylindrical receptacle; of a plurality of superimposed basket-shaped heating pipe units, each consisting of two horizontal circular pipe runs of different radius, connected by branch pipes and subdivided into segmental separable parts, means to supply steam to the upper parts of said basket-shaped heating pipe units and to exhaust steam from the lower parts of said units, and doors, provided in said receptacle, to remove said segmental separable parts of said units for repairing purposes.

In testimony whereof, I have signed my name to this specification in the presence of two subscribing witnesses, this 17th day of October, 1922.

HORACE F. RUGGLES.

Witnesses:
ABRAHAM LEPSON,
JOHN R. REYNOLDS.